United States Patent
Fritze

[15] 3,662,335
[45] May 9, 1972

[54] DEVICE FOR ROAD VEHICLES FOR THE WIRELESS TRANSMISSION OF AT LEAST ONE MEASURED VALUE OF A ROTATING WHEEL TO AN INDICATING INSTRUMENT

[72] Inventor: Kurt Fritze, Hamburg, Germany
[22] Filed: Oct. 8, 1969
[21] Appl. No.: 864,651

Related U.S. Application Data

[63] Continuation-in-part of Ser. No. 610,598, Jan. 20, 1967, abandoned.

[52] U.S. Cl................................340/58, 73/146.5, 180/103, 200/61.25
[51] Int. Cl.........................................B60c 23/02
[58] Field of Search....................340/58; 180/103; 73/146.5; 116/34 R; 200/61.25, 61.22; 307/10 R

[56] References Cited

UNITED STATES PATENTS

| | | | |
|---|---|---|---|
| 2,274,557 | 2/1942 | Morgan et al. | 340/58 |
| 2,040,375 | 5/1936 | Guthrie | 340/58 |
| 2,033,424 | 3/1936 | Gieskieng | 340/58 |

*Primary Examiner*—John W. Caldwell
*Assistant Examiner*—Glen R. Swann, III
*Attorney*—Holman & Stern

[57] ABSTRACT

A device for road vehicle wheels for a wireless transmission of electrical signals corresponding with at least one measured value, such as pressure, temperature, imbalance, etc. from a coupling element of the respective wheel to a coupling means fixed to the vehicle frame in proximity to said wheel and being connected with an indicating instrument located in the driver's cab or compartment on the vehicle frame, with the coupling element of the wheel extending coaxially to the wheel hub, and the coupling element extending radially outside of the rim base of the wheel about the entire circumference of the wheel and being accommodated in the tire casing near an outer edge of the rim of the wheel.

6 Claims, 13 Drawing Figures

DEVICE FOR ROAD VEHICLES FOR THE WIRELESS TRANSMISSION OF AT LEAST ONE MEASURED VALUE OF A ROTATING WHEEL TO AN INDICATING INSTRUMENT

BACKGROUND OF THE INVENTION

The present application is a continuation-in-part of my copending application Ser. No. 610,598 filed Jan. 20, 1967, now abandoned, and entitled "MEANS FOR THE WIRELESS TRANSMISSION OF MEASURED VALUES OF MOTOR VEHICLE WHEELS AND TIRES."

In the operation of motor vehicles and more particularly heavy trucks and vehicles for cross-country travel, it is desirable to monitor characteristic values on or in one or more of the wheels of the vehicle and this is particularly true during travel. This can be accomplished, for example, by the employment of a small, battery-fed transistor transmitter located at the valve and activated when the air pressure is insufficient with the transmitting frequency thereof being received by an antenna coil located on the vehicle frame and transformed by means of an amplifier into a warning signal for the driver of the vehicle.

Another possibility which is disclosed in German Pat. No. 1,048,195 comprehends the arrangement on the wheel, the tire or in the inner tube of passive electronic components such as capacitor surfaces or inductances which are varied, for example, by temperature and/or pressure responsive components or switches and which can couple with corresponding capacitor or inductances secured to the frame of the vehicle. The latter components, in turn, are connected as a function determining feedback or negative feedback in an oscillator circuit in order that a warning signal therefrom can be produced by way of a relay circuit.

In another known device the transmitter is fixed on the vehicle frame relatively to the wheel and is designed as a measuring transmitter which cooperates with a resonant circuit on or in the wheel and whose resonance frequency varies as a function of the values to be measured by virtue of suitable control elements. These variations of the resonance frequency of the resonant circuit in the wheel are established and evaluated inductively by the measuring transmitter. In this particular device, the necessary very close coupling between the resonant circuit and the measuring transmitter is not often possible and furthermore the resonance frequency or the damping varies in an uncontrollable fashion by virtue of the influence of metallic or magnetically active structural components of the vehicle thereby substantially reducing the measurement accuracy.

The problem posed to the inventor was how to transmit the measured value characteristic of the operation of a wheel or wheels of a motor vehicle in a reliable manner and with sufficient accuracy to an indicating instrument located in the operator's cabin or compartment while avoiding damage to or electrical variation of the parts necessary in or on the wheel due to centrifugal forces or other mechanical and climatic stresses developing during travel of the vehicle.

SUMMARY OF THE INVENTION

An essential aspect of the present invention is the defined accommodation, protected from environmental influences, of a coupling element on or within the wheel for reliably precluding variations of the electrical values during operation as well as over long or extended periods of time.

A further important aspect of the invention is that the transmission of the characteristic measured values occurs continuously and independently of the momentary rotational position and other positions in space of the particular wheel of the vehicle in question.

The solution of the problem is achieved by the provision of a device for road vehicles for a wireless transmission of at least one measured value, such as pressure, temperature, imbalance, etc. from a rotating or turning wheel to an indicating instrument located in the cab or compartment for the vehicle driver or operator which includes an oscillator arranged on the frame of the vehicle having a feed back circuit containing a coupling means fixedly provided adjacent the wheel and a coupling element disposed in or on the wheel cooperable with the coupling means for varying the feedback characteristic of the oscillator as a function of the measured value or values to be transmitted and extending about the entire periphery of the wheel and with the indicating instruments responding to the variations of the oscillatory condition of the oscillator corresponding to the particular variations of the feedback characteristic connected with the output of the oscillator.

The invention further comprehends a device for a wireless transmission of at least one measured value, such as pressure, temperature, imbalance, etc. from a rotating or turning wheel to an indicating instrument located in the operator's cab or compartment in which an oscillator-antenna unit located within the wheel extends about the entire periphery of the wheel and whose oscillatory condition is variable in its amount or frequency as a function of variations of the measured value or value to be transmitted and a receiver responsive to the oscillations of the oscillator-antenna unit located on the frame of the vehicle in proximity to the vehicle wheel with the output of the receiver being connected to the indicating instrument which responds to the variations of the oscillatory condition of the oscillator-antenna unit picked up by the receiver.

The coupling element arranged in or on the wheel of the vehicle preferably is defined by a resonant circuit whose components are variable as a function of the pressure and/or temperature prevailing in the vehicle wheel and such variability can be accomplished either by means of a setting drive actuated as a function of pressure or temperature or, for example, by employing a capacitor with a pressure or temperature dependent dielectric.

In accordance with a further aspect of the invention, the coupling element includes a resonant circuit provided with a switch which is actuable by a temperature and/or pressure-dependent setting drive and the coupling element as well as the oscillator-antenna unit extend over the entire circumference of the vehicle wheel and are lodged or positioned either in proximity to the rim outer edge in or on the casing of the tire or in the case of tires having an inner tube, in a bead-like band or in the tube per se.

Further objects and advantages of the invention will become more readily apparent to persons skilled in the art from the following detailed specification and annexed drawings and in which drawings:

DETAILED DESCRIPTION OF THE INVENTION

Figure 1:
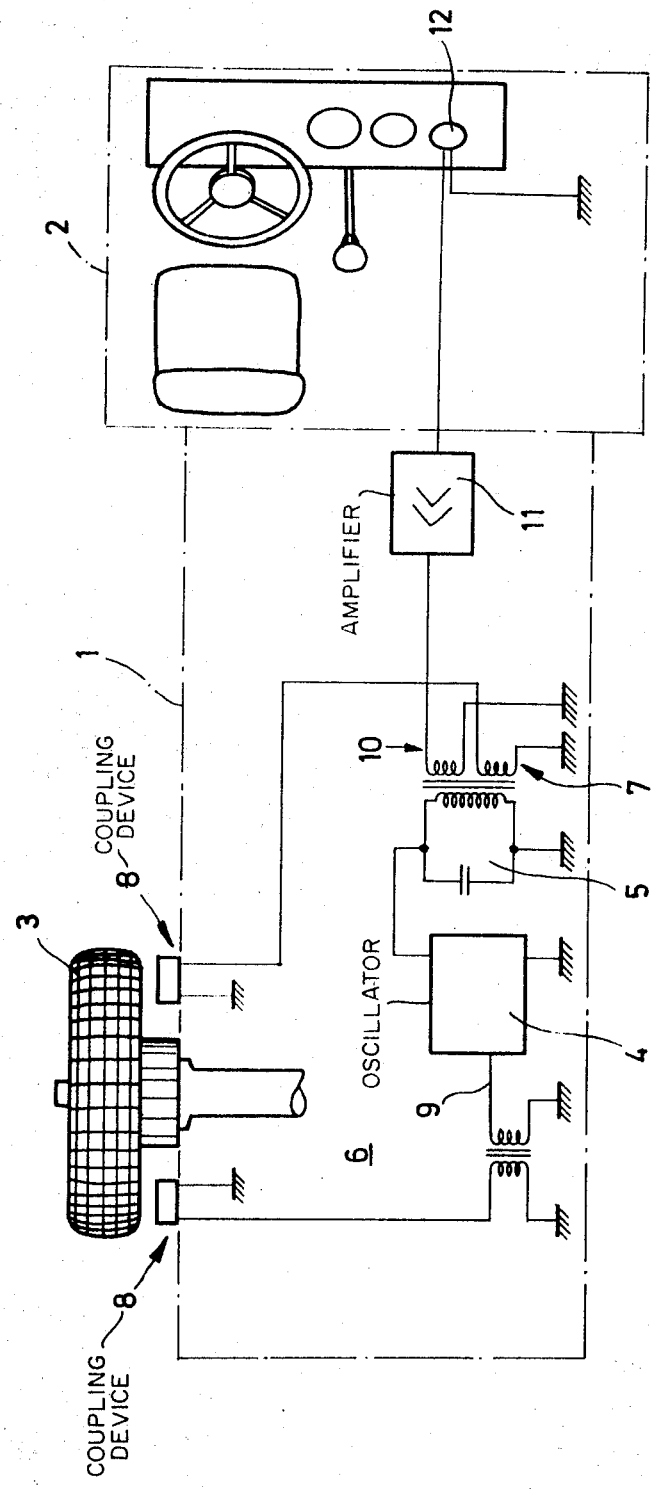
FIG. 1 is a diagrammatic plan view of a motor vehicle embodying one embodiment of the present invention.

With reference to FIG. 1 there is illustrated a vehicle generally denoted 1 which at the front end thereof is provided with a cab or compartment 2 for the driver or operator of the vehicle. The vehicle 1 is preferably a truck or vehicle of the type employed for cross-country travel. For the purposes of clarity a single wheel 3 of which the value characteristic of the operational condition is to be measured and transmitted to the driver's cab or compartment 2 is illustrated.

It will be noted that a transmitter such as an oscillator 4 is fixedly mounted on the frame of the vehicle 1 in relation to the wheel 3 and has associated therewith an anode output circuit 5. A feedback circuit denoted 6 connected with the oscillator 4 is coupled at 7 to the anode circuit and leads to a feedback input 9 by way of coupling devices 8. It is believed clear that the components 7 and 9 constitute the connecting points between the feedback circuit 6 and the oscillator 4 and that the coupling devices 8 lie within the feedback circuit 6. The coupling device 8 may be defined by inductive coupling coils which are secured to the frame of the vehicle opposite the wheel 3 to be monitored.

An amplifier 11 is coupled to the anode circuit 5 of the oscillator 4 as indicated at 10 and serves for feeding an indicating instrument 12 located in the cab or compartment 2. The instrument 12 may be in the form of an acoustic and/or optical signalling system which is energized by a corresponding output signal of the amplifier 11.

A coupling element is located within the wheel 3 and the specific details thereof will hereinafter be more fully set forth. The coupling element possesses a property of varying the feedback characteristics of the feedback circuit 6 as a function of the measured values to be monitored in such a way that the oscillatory condition of the oscillator 4 also varies according to the determined variations of the measured values in the wheel 3. These variations of the oscillatory condition of the oscillator 4 result in a corresponding output signal of the amplifier 11 and consequently a release of the indicating instrument 12.

Figure 1A:
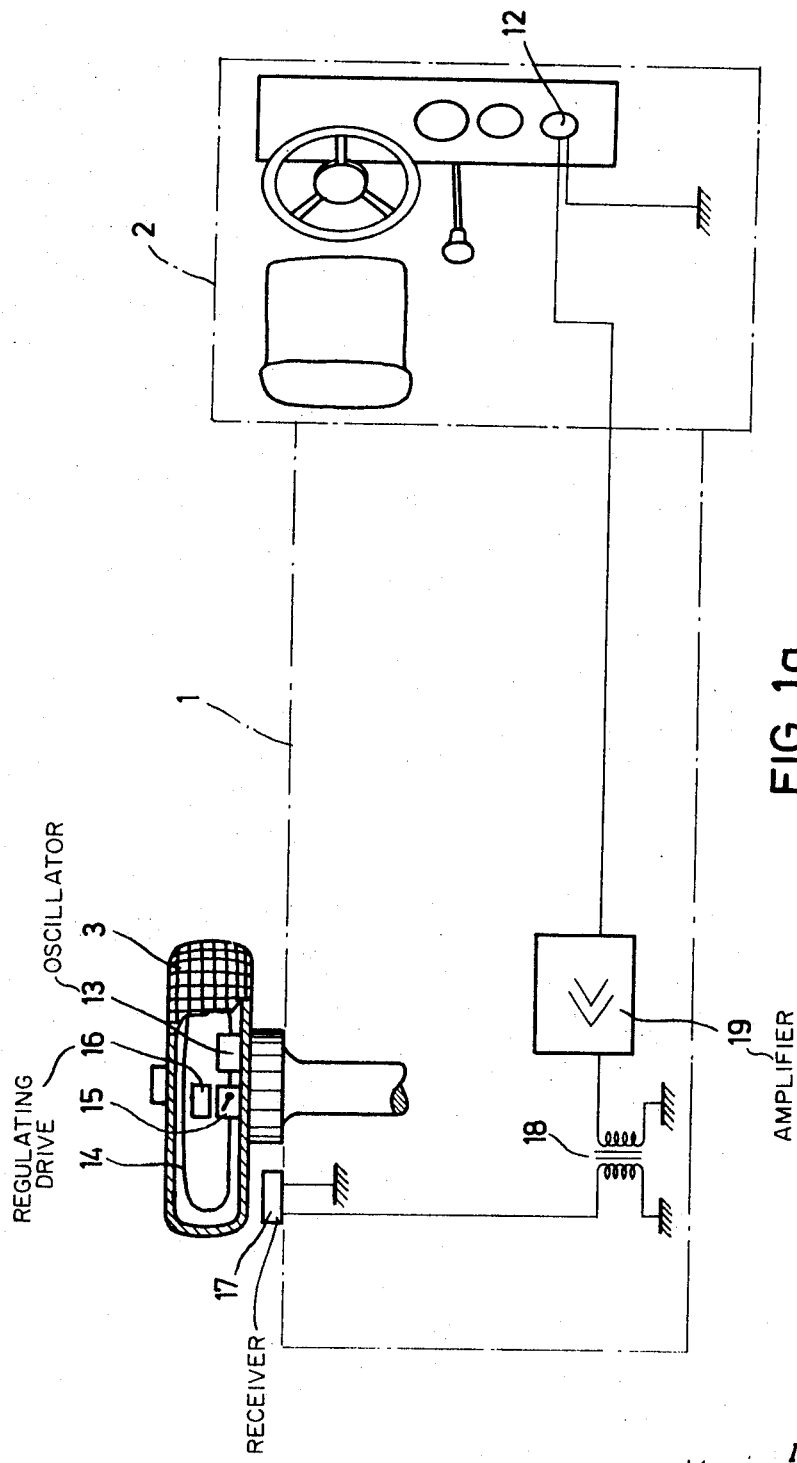
FIG. 1a is a view similar to FIG. 1 of a further embodiment of the invention.

In the embodiment of the invention illustrated in FIG. 1a, there are arranged in the wheel 3 whose characteristic values are to be monitored a small battery-fed oscillator 13 and an antenna 14 connected therewith with such components together constituting an oscillator-antenna unit which extends about the entire circumference of the wheel 3. A switch 15 controls the frequency or output of the unit constituted by the oscillator and antenna.

The actuation of the switch 15 is effected by a setting or regulating drive 16 which is controlled as a function of the pressure or temperature.

A receiver 17 is disposed on the vehicle frame opposite the wheel 3 and the output thereof is coupled, for example, as indicated at 18 to an amplifier 19. The amplifier 19 functions, as set forth in the description of FIG. 1, for controlling the indicating instrument 12 located in the cab or compartment 2.

Figure 2:
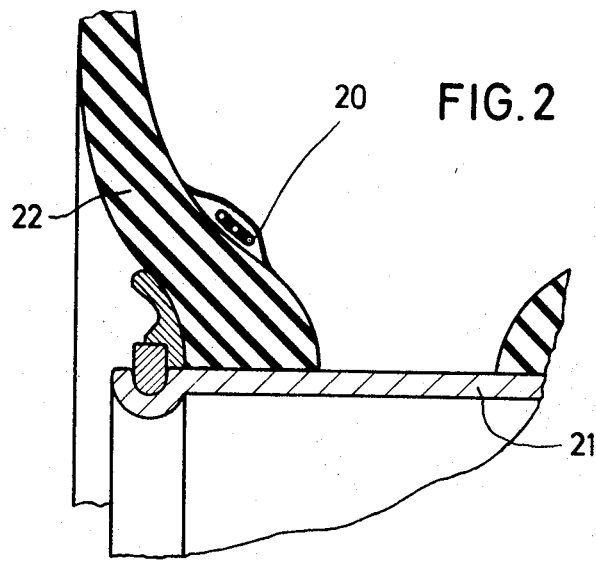
FIGS. 2–4 are fragmentary sectional views taken through a motor vehicle wheel illustrating embodiments of the invention.
Figure 3:
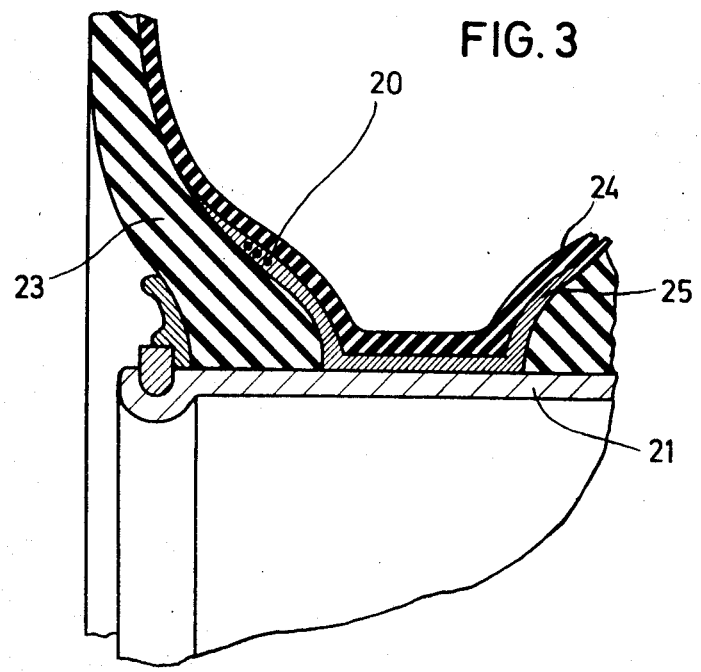
Figure 4:
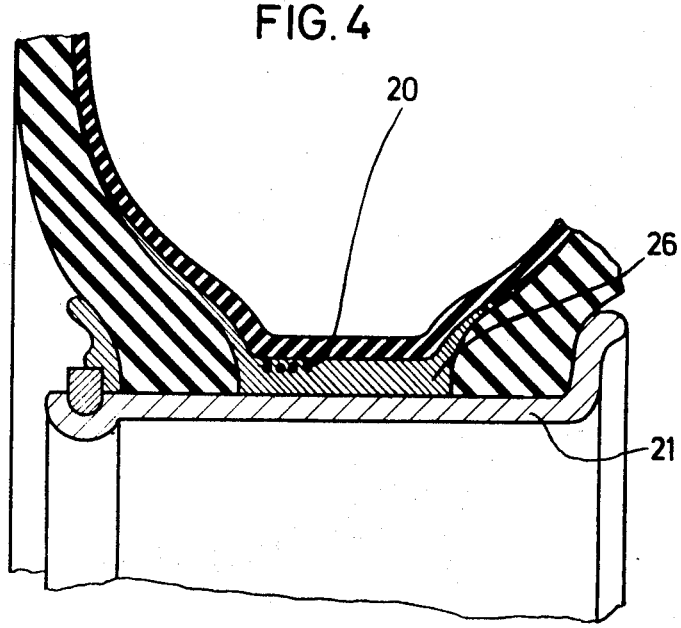

The coupling element or the oscillator-antenna unit of the present invention previously described and located within the wheel are illustrated in FIGS. 2–4 which are fragmentary transverse sectional views. The components constituting the coupling element or the oscillator-antenna unit in these figures are in the form of one or more copper strands 20 extending about the circumference of the wheel in proximity to the rim outer edge and in parallelism to one another. Such strands define either the inductance of the coupling element as illustrated in FIG. 1 or an antenna coil of the oscillator-antenna unit shown in FIG. 1a. It will be apparent to one skilled in the art that other components of the coupling element or the oscillator-antenna unit may be in other cross-sectional forms and the showings in the figures in question are merely for indicating the position of such components with respect to any axial plane.

Referring more specifically to FIG. 2, it will be noted that the wheel includes a rim 21 of a wheel for a truck or other cross-country type vehicle on which is mounted a tubeless tire 22. The coupling element or oscillator-antenna unit is vulcanized to the inside of the tire in proximity to the radial rim outer edge so that the respective components extend about the entire circumference of the wheel in parallelism to the edge of the rim. The distance of the coupling element or of the oscillator-antenna unit from the rim outer edge is so selected that the electrically active components are not subject, on the one hand, to too great a beating stress, and on the other hand, too great a damping between the elements in the wheel and the elements secured to the frame of the vehicle.

The embodiment illustrated in FIG. 3 includes a rim 21, a tire casing 23 and an inner tube 24. A bead-like band 25 lies between the tube 24 and the rim 21 or the casing 23 respectively and in the lateral flange thereof adjacent the outer edge of the rim, copper strands 20 extending in parallelism are enclosed and such strands define a part of the coupling element or the oscillator-antenna unit respectively.

Figure 3A:
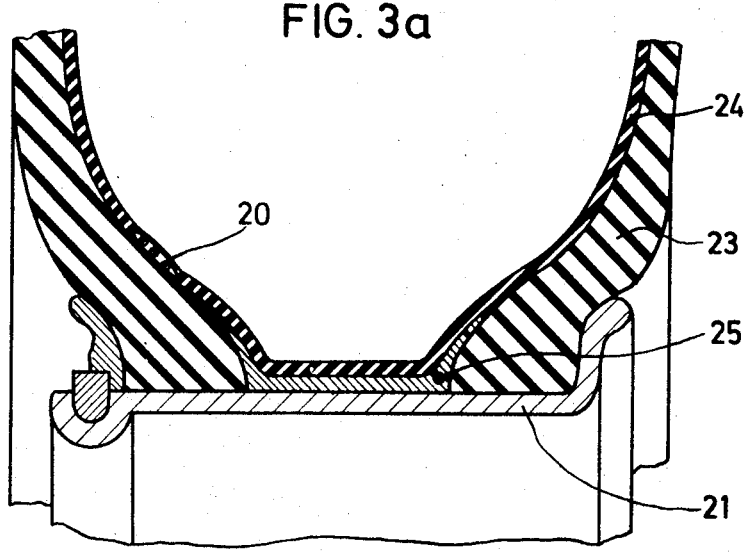

Turning now to FIG. 3a, this embodiment differs from that illustrated in FIG. 3 in that the copper strands 20 are positioned directly in the tube 24 rather than in the bead-like band 25.

In the embodiment illustrated in FIG. 4 it will be noted that the copper strands 20 or the corresponding components of the coupling element or the oscillator-antenna unit are enclosed in a special bead-like band 26. More specifically, the base of the band 26 is of such thickness that, for avoiding excessive dampening, a sufficient distance is maintained between the electrically active parts of the component elements or the oscillator-antenna unit on the one hand and the rim 21 on the other hand.

In a further embodiment, the bead-like band 26 may be thickened toroidally in the area of the copper strands 20 thereby resulting in a yet greater distance or location of the strands 20 from the rim 21.

Several embodiments of construction of the coupling element located within the wheel 3 as shown in FIG. 1 are illustrated specifically in FIGS. 5a to 5e.

Figure 5A:
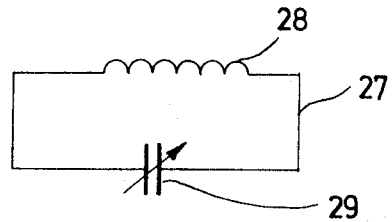
FIGS. 5a–5g are diagrammatic views illustrating the components in accordance with FIG. 1 located within the wheel.

In FIG. 5a it will be noted that the coupling element is in the form of a resonant circuit 27 containing a substantially invariable inductance 28 and a capacitor 29 whose value varies as a function of variations of the measured value to be monitored. If the temperature within the wheel is to be monitored, a temperature dependent variation of the capacitance value of the capacitance 29 can be accomplished in that either a dielectric with a temperature dependent dielectric constant is employed or that the plate distance of the capacitor is varied by means of a setting or regulating drive which has, for example, the form of a bimetallic element in heat conducting contact with the rim on the tire casing. A pressure dependent variation of the capacitance value can be secured by varying the plate distance or the foil coating of the capacitor such as, for example, by means of a pressure sensitive bellows.

Figure 5B:
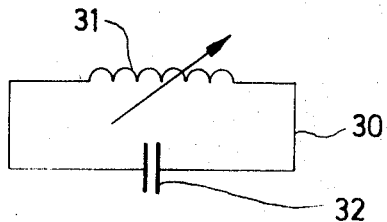

In FIG. 5b a resonant circuit 30 constituting a coupling element includes an inductance 31 which is variable with the measured value and a substantially invariable capacitor 32. The variation of the value of the inductance 31 can be realized by means of a suitable setting or regulating drive which responds to pressure and/or temperature, or by means of a ferrite material of a temperature dependent permeability.

Figure 5C:
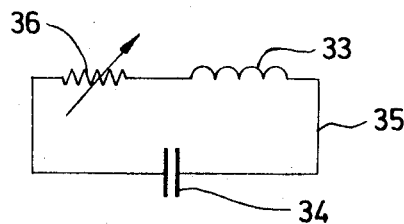

The damping properties and as a consequence the coupling properties of a resonant circuit 35 illustrated in FIG. 5c which contains an inductance 33 and a capacitor 34 are varied by means of a resistance 36 which is variable with the pressure or temperature and which is connected in the resonant circuit 35.

Figure 5D:
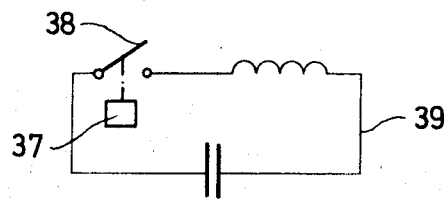

In the embodiment illustrated in FIG. 5d, in lieu of the resistance 36 which is variable with the temperature, a switch 38 is provided in the resonant circuit with the switch being controlled by a setting or regulating drive 37 which activates or deactivates resonant circuit 39 dependent upon the measured value.

Figure 5E:
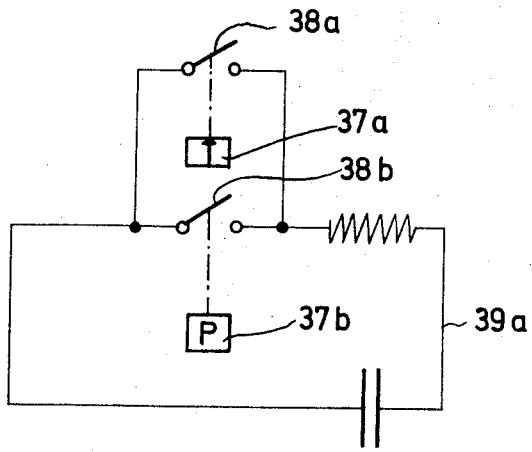

While in the embodiment disclosed in FIG. 5d, a single regulating or setting drive for the measured value dependent control of the switch 38 is provided, in FIG. 5e, two different setting or regulating drives 37a and 37b function for controlling parallel switches 38a, 38b associated therewith and which together constitute an OR circuit member. The resonant circuit 39a by way of the OR circuit member is activated or deactivated when either the drive 37a responds due to the permissible temperature being exceeded, or the drive 37b due to a deviation from the permissible pressure values.

Figure 5F:
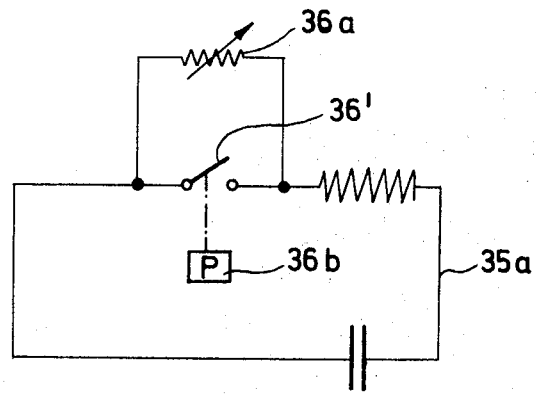

In FIG. 5f which corresponds to the circuitry according to FIG. 5c, a switch 36' is positioned in parallel with the resistance variable with the temperature and denoted 36a and such switch is controlled by a setting or regulating drive 36b responding to deviations from the theoretical values of the pressure. This circuitry similar to the arrangement illustrated in FIG. 5e permits a control of the resonant circuit 35a as a function of the measured pressure and/or temperature values of the respective wheel of the vehicle.

Figure 5G:
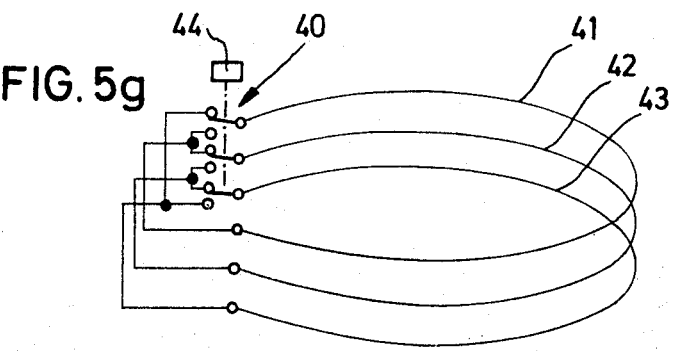

In the embodiment of FIG. 5g, in lieu of the switch 38 shown in FIG. 5d, there is provided a three-pole reversing switch 40 which selectively connects in parallel or in series with one another three conductor cables 41, 42, 43 extending in parallel and defining a coupling inductance. Here again, the switch is activated by means of a setting or regulating drive 44 which is controlled in dependence upon the temperature.

It will be appreciated that all embodiments of the coupling element illustrated in FIGS. 5a to 5g possess in common that such elements are in the form of an annular component extending about the circumference of the rim and in which the circuit elements are arranged in such a fashion that there results mechanically a unit which is substantially uniform as regards inertia.

With respect to the operating frequency of the present invention, it should be pointed out that in order to attain a certain accuracy of measurement or a response sensitivity of the device on the one hand and to avoid excessive damping on the other hand a certain frequency range should be maintained and this range is preferably between 30 kHz and 500 kHz.

I claim:

1. A device for road vehicle wheels in which the wheels include a rim and a tire casing, with the device being for the wireless transmission of electrical signals corresponding with at least one measured value, such as pressure, from a coupling element of the respective wheel to a coupling means fixed to the vehicle frame in proximity to said wheel and being connected with an indicating instrument located in an operator's compartment on the vehicle frame, said coupling element of said wheel extending coaxially to the wheel hub, the improvement being that said coupling element extends radially outside of the rim base of the wheel about the entire circumference of the wheel, and being accommodated in the tire casing near an outer edge of the rim of the wheel.

2. The device for the wireless transmission of at least one measured value as claimed in claim 1 in which said coupling element is vulcanized to the inside of the tire casing.

3. The device for the wireless transmission of at least one measured value as claimed in claim 1 including an inner tube within the tire casing, said coupling element being accommodated in the inner tube near the outer edge of the rim.

4. The device for the wireless transmission of at least one measured value as claimed in claim 1 and further including an inner tube within the tire casing, and a separate bead said bead band having portions located between the rim and the inner tube and the tire casing and the inner tube, respectively, said coupling element being accommodated in said bead band.

5. The device for the wireless transmission of at least one measured value as claimed in claim 4, in which said coupling element is accommodated in the portion of said bead band located between the tire casing and the inner tube.

6. The device for the wireless transmission of at least one measured value as claimed in claim 4, in which said coupling element is accommodated in the portion of the bead band located between the rim and the inner tube.

* * * * *